(12) United States Patent
Ono

(10) Patent No.: US 6,728,956 B2
(45) Date of Patent: *Apr. 27, 2004

(54) DATA PROCESSOR, PROGRAM UPDATING METHOD AND STORAGE MEDIUM

(75) Inventor: Kenichiro Ono, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/379,731

(22) Filed: Aug. 24, 1999

(65) Prior Publication Data
US 2003/0110483 A1 Jun. 12, 2003

(30) Foreign Application Priority Data

Aug. 28, 1998 (JP) .......................................... 10-257623
Aug. 18, 1999 (JP) .......................................... 11-231475

(51) Int. Cl.⁷ .............................................. G16F 9/44
(52) U.S. Cl. .................... 717/168; 717/169; 717/170; 717/171; 717/172; 712/220; 712/225; 713/178
(58) Field of Search ................................ 717/168–173; 713/2, 178, 502; 712/37, 220, 225; 716/6; 709/246; 700/1, 14; 348/730; 340/7.43; 375/316

(56) References Cited

U.S. PATENT DOCUMENTS

| | | | | |
|---|---|---|---|---|
| 5,101,508 A | * | 3/1992 | Owaki | 455/158.2 |
| 5,210,854 A | * | 5/1993 | Beaverton et al. | 717/168 |
| 5,511,188 A | * | 4/1996 | Pascucci et al. | 707/203 |
| 5,761,504 A | * | 6/1998 | Corrigan et al. | 713/2 |
| 5,878,256 A | * | 3/1999 | Bealkowski et al. | 717/168 |
| 5,895,123 A | * | 4/1999 | Fujii et al. | 386/96 |
| 5,896,555 A | * | 4/1999 | Yoshinobu | 725/117 |
| 5,974,312 A | * | 10/1999 | Hayes, Jr. et al. | 455/419 |
| 6,055,413 A | * | 4/2000 | Morse et al. | 340/7.43 |
| 6,070,012 A | * | 5/2000 | Eitner et al. | 717/170 |
| 6,148,441 A | * | 11/2000 | Woodward | 717/168 |
| 6,188,695 B1 | * | 2/2001 | Przybysz | 370/410 |
| 6,199,203 B1 | * | 3/2001 | Saboff | 717/169 |
| 6,279,153 B1 | * | 8/2001 | Bi et al. | 717/171 |
| 6,341,143 B1 | * | 1/2002 | Nelson et al. | 375/222 |
| 6,359,894 B1 | * | 3/2002 | Hong et al. | 370/402 |
| 6,373,904 B1 | * | 4/2002 | Sakamoto et al. | 375/316 |
| 6,397,385 B1 | * | 5/2002 | Kravitz | 717/173 |
| 6,438,748 B1 | * | 8/2002 | Gard et al. | 717/168 |
| 6,452,644 B1 | * | 9/2002 | Shimakawa et al. | 348/730 |
| 6,510,350 B1 | * | 1/2003 | Steen et al. | 700/9 |
| 6,532,591 B1 | * | 3/2003 | Arai et al. | 725/132 |

FOREIGN PATENT DOCUMENTS

| | | | | |
|---|---|---|---|---|
| JP | 06-044064 | | 2/1994 | G06F/9/06 |
| JP | 11-102287 | | 4/1999 | G06F/9/06 |

OTHER PUBLICATIONS

Title: On the Propagation of Updates in Distributed Replicated Systems, author: Misra et al, IEEE, Sep., 1998.*
Title: Program recording reservation apparatus for audio and video data broadcast system, author: Emura, K. Derwent Acc No. 1999–596016, 1999.*

* cited by examiner

Primary Examiner—Chameli C. Das
(74) Attorney, Agent, or Firm—Fitzpatrick, Cella, Harper & Scinto

(57) ABSTRACT

A data processor capable of preventing a system from starting up improperly due to incomplete program updating. The data processor receives, by way of an external interface, a program which is sent by communicating medium such as a broadcast wave or a telephone network from an external device and stores the received program into a memory B which is different from a memory A storing a program for the system when a version of the received program is newer than that of a program currently executed by the data processor, thereby starting up an MPU at the next time with the program stored in the memory B.

15 Claims, 12 Drawing Sheets

FIG. 12

SETTING SCREEN

CHANGE PROGRAM ?    OK ?

DATA PROCESSOR, PROGRAM UPDATING METHOD AND STORAGE MEDIUM

BACKGROUND OF THE INVENTION

1. Field of the Invention

The present invention relates to a data processor, a program updating method and a storage medium, and more specifically a data processor, a program updating method and a storage medium which update a program with data sent from outside.

2. Related Background Art

In a data processor which executes various kinds of application programs such as those for personal data management functions, it is general to write a program such as firmware for obtaining executing environments for the application programs into a nonvolatility memory.

The program written in the nonvolatility memory is rewritten when a bug exists in the program or when a version of the program is to be upgraded.

Japanese Patent Application Laid-Open No. 6-44064 discloses a method to rewrite the program stored in the nonvolatility memory. This method is configured by receiving and temporarily holding an updating program sent from outside by way of a broadcast wave or a telephone network, and automatically rewriting the program stored in the nonvolatility memory into the received program.

Furthermore, digital broadcast has a high possibility to provide new kinds of services one after another as compared with conventional analog broadcast. Accordingly, a receiver for the digital broadcast which is newly purchased may soon be out-of-date when its functions remain unchanged from those at a time of purchase and cannot cope with the new kinds of services.

In order to solve such a problem, there is a concept to modify a software program to cope with the new kinds of services without changing any hardware of the receiver. That is, there is a method which sends a program in a condition overlapped with a broadcast wave for downloading, thereby updating a program in an instrument which is capable of receiving the digital broadcast.

However, the method disclosed by Japanese Patent Application Laid-Open No. 6-44064 is configured by rewriting the program stored in the nonvolatility memory into a new program and may update the program incompletely when a power supply is intercepted due to power failure during the updating of the program, thereby resulting in a situation where a system cannot start up due to the incomplete updating of the program.

Furthermore, the method does not take an operating condition of the instrument into consideration for downloading and may update the program even while the receiving instrument is operating, thereby resulting in an erroneous operation of the instrument.

SUMMARY OF THE INVENTION

A primary object of the present invention is to provide a data processor, a program updating method and a storage medium which are capable of preventing a system from being started up improperly due to incomplete program updating.

Another object of the present invention is to provide a data processor, a program updating method and a storage medium which update a program on the basis of an operating condition on a receiving side.

In order to attain these objects, the data processor according to the present invention is a data processor operating on the basis of a program stored in first memory means, and comprising receiving means which receives an updating program sent from outside, comparing means which compares a version of the program stored in the first memory means with a version of the updating program, and control means which stores the updating program into second memory means different from the first memory means when the comparing means judges that the version of the updating program is newer than the version of the program stored in the first memory means.

Furthermore, the data processor according to the present invention is a data processor having processing means which processes data transmitted from outside on the basis of a program stored in the first memory means and outputs the data to an output device, and comprising receiving means which receives an updating program sent from outside, control means which stores the received updating program into second memory means different from the first memory means, and changing means which changes processing by the processing means on the basis of the program stored in the first memory means to processing by the processing means on the basis of the updating program stored in the second memory means.

Furthermore, the data processor according to the present invention is a data processor having processing means which processes data sent from outside on the basis of a program stored in memory means and outputs the data to an output device, and comprising judging means which judges whether or not processing is executed by the processing means, receiving means which receives an updating program sent from outside, memory control means which stores the received updating program into the memory means when the processing is not executed by the processing means and a processing control means which controls the processing means on the basis of the updating program stored in the memory means.

Moreover, the program updating method according to the present invention is a program updating method which updates a program in a data processor operating on the basis of a program stored in first memory means, and is configured to receive an updating program sent from outside using receiving means, compare a version of the program stored in the first memory means with a version of the updating program and store the updating program into second memory means different from the first memory means when the comparison indicates that the version of the updating program is newer than the version of the program stored in the first memory means.

Moreover, the program updating method according to the present invention is a program updating method which updates a program in a data processor having processing means for processing data sent from outside on the basis of a program stored in first memory means and outputting the data to an output device, and is configured to receive an updating program sent from outside using receiving means, store the received updating program into the second memory means different from the first memory means and change processing by the processing means on the basis of the program stored in the first memory means to processing by the processing means on the basis of the updating program stored in the second memory means.

Moreover, the program updating method according to the present invention is a program updating method which updates a program in a data processor having processing means for processing data sent from outside on the basis of a program stored in memory means and outputting the data to an output device, and is configured to judge whether or not processing is executed by the processing means, store an updating program sent from outside into the memory means when the processing is not executed by the processing means and control the processing means on the basis of the updating program stored in the memory means.

In addition, the storage medium according to the present invention is a memory means which is to be used in a data processor operating on the basis of a program stored in first memory means, and comprises a step to receive an updating program sent from outside using receiving means, a step to compare a version of the program stored in the first memory means with a version of the updating program and a step to store the updating program into second memory means different from the first memory means when the comparison indicates that the version of the updating program is newer than the version of the program stored in the first memory means.

In addition, the storage medium according to the present invention is a storage medium which is to be used in a data processor having processing means for processing data sent from outside on the basis of a program stored in first memory means and outputting the data to an output device, and comprises a step to receive an updating program sent from outside using receiving means, a step to store the received updating program into second memory means different from the first memory means and a step to change processing by the processing means on the basis of the program stored in the first memory means to processing by the processing means on the basis of the updating program stored in the second memory means.

In addition, the storage medium according to the present invention is a storage medium which is to be used in a data processor having processing means for processing data sent from outside on the basis of a program stored in memory means and outputting the data to an output device, and comprises a step to judge whether or not processing is executed by the processing means, a step to store an updating program sent from outside into the memory means when the processing is not executed by the processing means and a step to control the processing means on the basis of the updating program stored in the memory means.

BRIEF DESCRIPTION OF THE DRAWINGS

FIG. 12 is a diagram showing a screen for program updating.

DETAILED DESCRIPTION OF THE PREFERRED EMBODIMENTS

Now, the preferred embodiments of the present invention will be described with reference to the accompanying drawings.

First Embodiment

Figure 1:
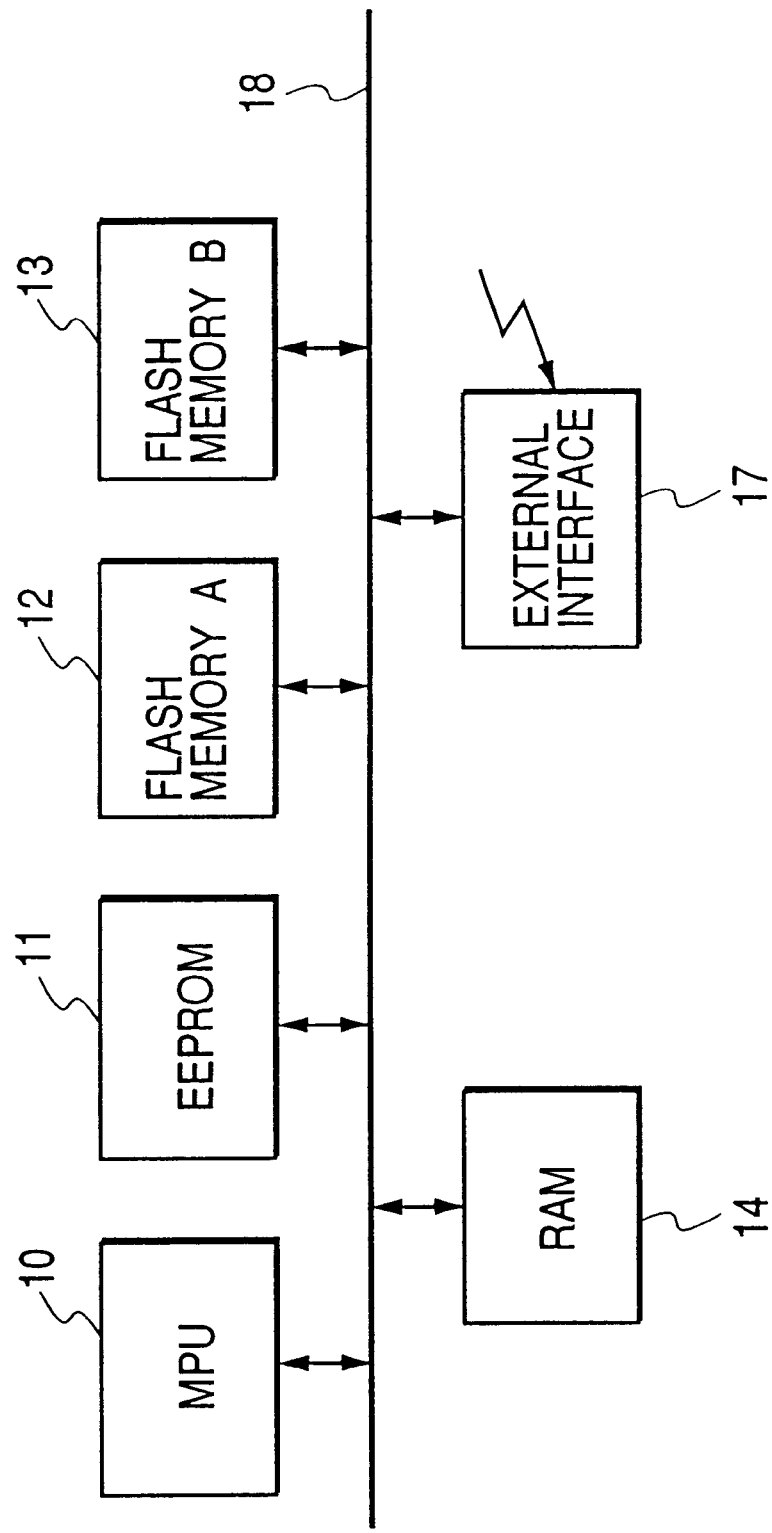
FIG. 1 is a block diagram showing a configuration of a first embodiment of the data processor according to the present invention.

FIG. 1 is a block diagram showing a configuration of a data processor preferred as the first embodiment of the present invention.

The data processor comprises, as shown in FIG. 1, an MPU 10 which controls a system according to a program stored in a flash memory A 12 or a flash memory B 13, an EEPROM 11 which stores a jump instruction which indicates whether MPU 10, after a reset process is released, selects the program stored in the flash memory A 12 or the flash memory B 13, a RAM 14 which provides a work area for the MPU 10 and an external interface 17 serving as an interface with external devices (not shown): the MPU 10 being connected to each of the blocks by way of a common bus 18. Needless to say, other members are connected as occasion demands.

A common bus 18 has addresses of 20 bits: addresses FFFF0h through FFFFFh assigned to the EEPROM 11, addresses 00000h through 3FFFFh assigned to the flash memory A 12, addresses 40000h through 7FFFFh assigned to the flash memory B 13 and addresses 80000h through BFFFFh assigned to the RAM 14.

Then, description will be made of processings performed by the MPU 10 in the data processor with reference to FIG. 2.

Figure 2:
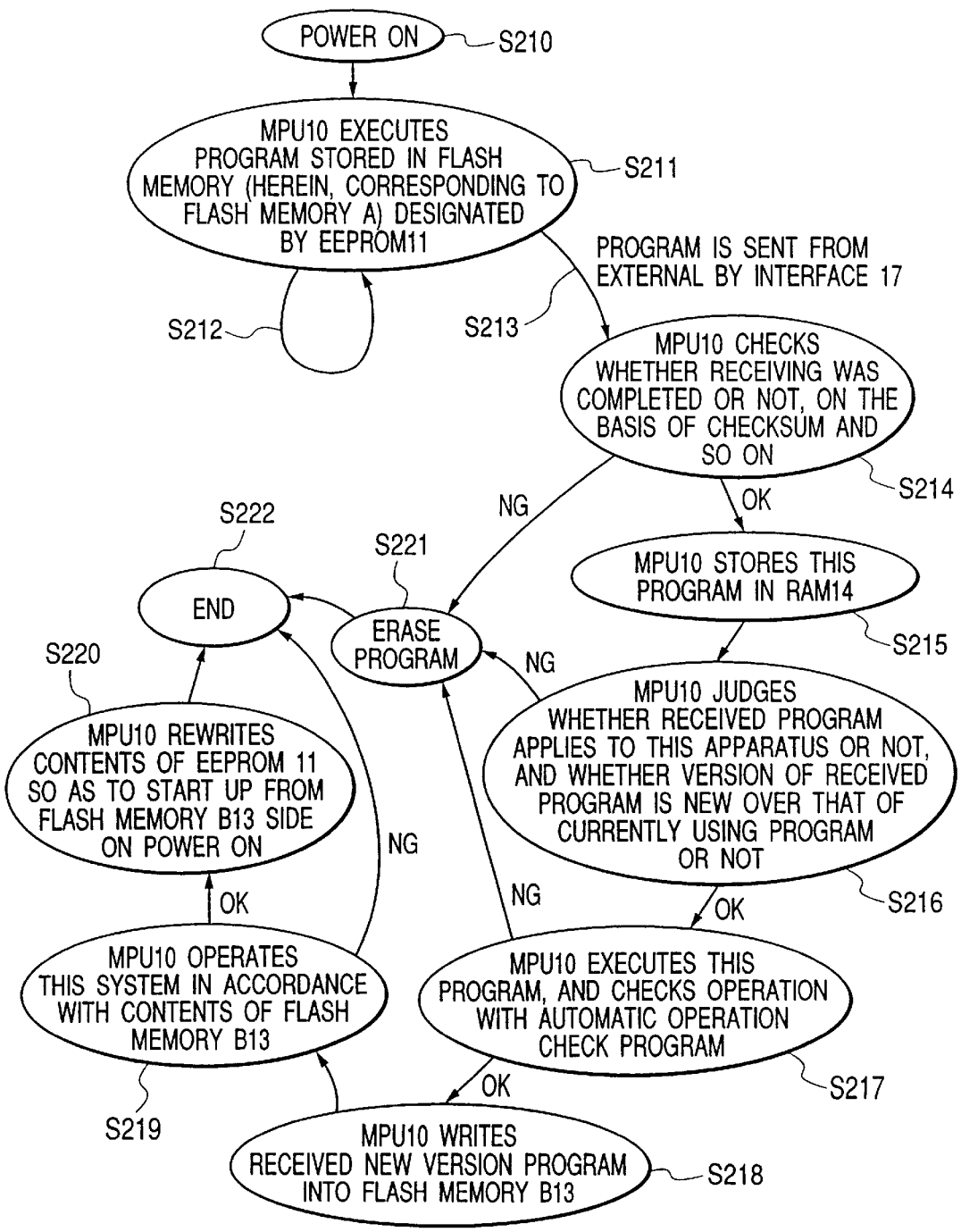
FIG. 2 is a diagram illustrating status transition of processes to update a program in the data processor shown in FIG. 1.

FIG. 2 is a diagram showing status transition of processes to update a program in the data processor shown in FIG. 1. The processes are carried out on the basis of a program stored in the flash memory A 12 or B 13 and includes a processing to update the program.

When a reset process is released by turning on a power source with a power switch (not shown)(step S210), the MPU 10 designates the addresses FFFF0h and reads out contents of EEPROM 11 assigned to this area. Since a jump instruction written in the contents, the MPU 10 selects the program stored in the flash memory A 12 or B 13 on the basis of the jump instruction and starts up the system according to the selected program (step S211). Let us assume here that the flash memory A 12 is selected and the MUP 10 executes the processing according to the program stored in the flash memory A 12.

In a condition where the system is started up as described above (step S212), the MPU 10 receives a program transmitted by a communicating medium such as a broadcast wave or a telephone network from an external device by way of an external interface 17 (step S213), checks whether or not the program is completely received on the basis of a check sum or the like (step S214) and erase the received program when the reception of the program is not normally completed (step S221). The MPU 10 terminates the processing in this way (step S222).

When the reception of the program is normally completed, the received program is temporally stored in a RAM 14 (step S215).

Then, the MPU 10 judges, on the basis of data such as ID contained in the received program, whether or not the received program applies to the system and whether or not a version of the received program is newer than that of a currently used program (step S216). When the received program does not apply to the system or when the version of the received program is not newer than that of the currently used program, the MPU 10 judges the received program as an unwanted program and erases it (step S221).

When the received program applies to the system and its version is newer than that of the currently used program, the MPU 10 judges that the received program is a program to be updated and checks the program for its operation (step S217).

To check the received program for its operation, the MPU 10 starts it up and checks its operation with an automatic operation check program. When the MPU 10 recognizes that the received program does not operate normally as a result of the operation check, it erases the received program (step S221).

When the MPU 10 confirms that the received program operates normally as a result of the operation check, it writes the received program i.e. the updating program into the flash memory B 13 which is not selected (step S218) and operates the system in accordance with contents of the program stored in the flash memory B 13 (step S219). When the system does not operate normally, the MPU 10 terminates the processing in a condition where the program is written in the flash memory B 13 (step S222). When the system operates normally, the MPU 10 rewrites the contents of the EEPROM 11 so that the flash memory B 13 is selected when the power source is turned on the next time (step S220) and terminates the processing (step S222).

When the received program is a program to be updated and can normally operates as described above, the received program is written into the flash memory B 13 and the flash memory B 13 is selected when the power source is turned on the next time, whereby a program having a new version is started up when the power source is turned on the next time.

When the system does not operate normally in accordance with the contents of the flash memory B 13, the flash memory A 12 is selected when the power source is turned on the next time, whereby the system operates in accordance with the contents of the flash memory A 12. Accordingly, the data processor is capable of preventing the system from being misoperated or not started due to incomplete program updating into the flash memory B 13.

When the flash memory B 13 is selected, the updating program is written into the flash memory A 12, whereby a program having a newest version is stored in the flash memory A 12 and a program having an older version is stored in the flash memory B 13.

Second Embodiment

Now, the second embodiment of the present invention will be described with reference to FIG. 3.

Figure 3:
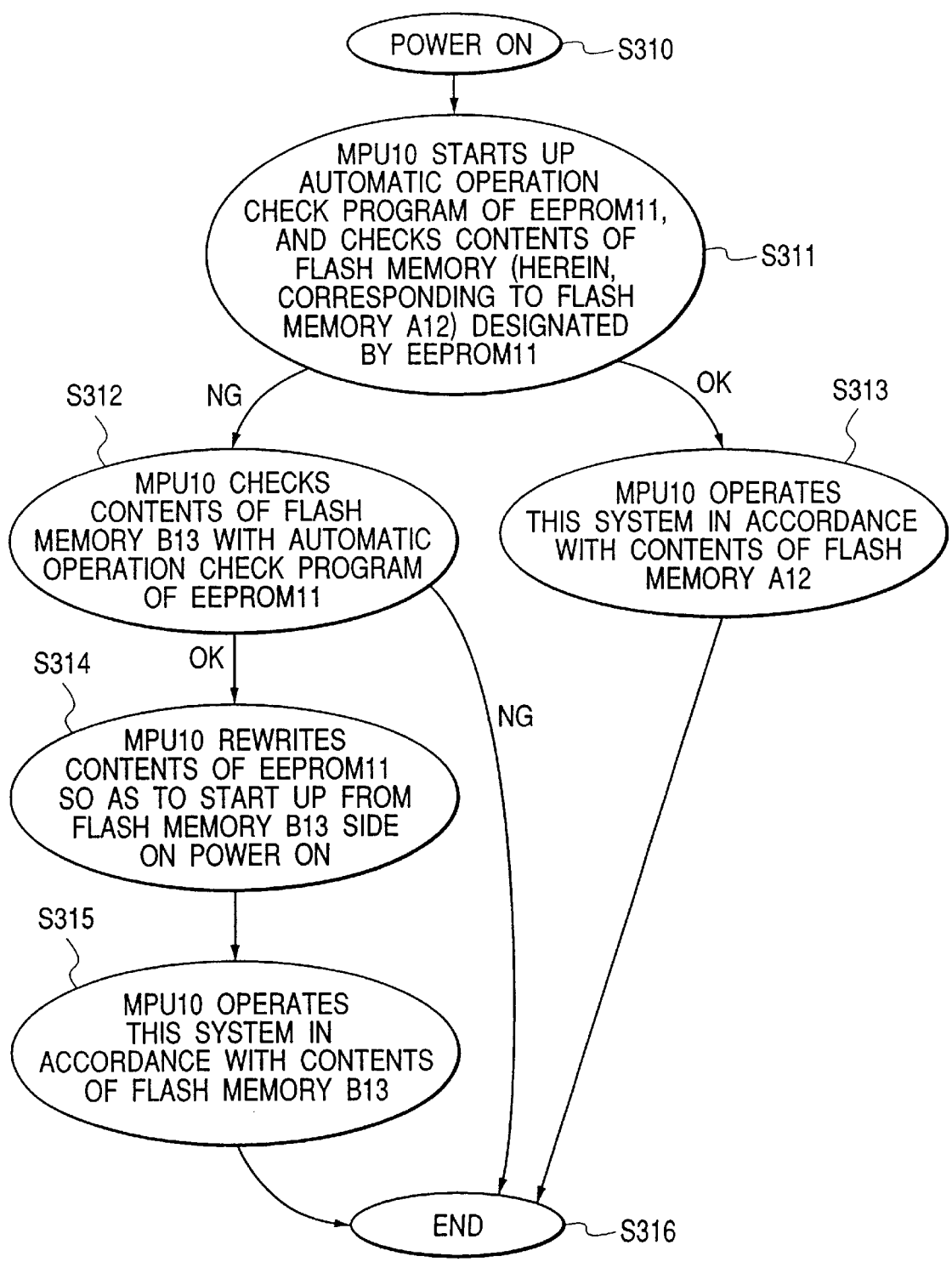
FIG. 3 is a diagram illustrating status transition of processes to update a program in a second embodiment of the data processor shown in FIG. 1.

FIG. 3 shows status transition of processes to update a program in the second embodiment of the data processor shown in FIG. 1. The second embodiment uses members which are similar to those of the first embodiment and not described in particular.

The second embodiment is configured to store an automatic operation check program and a jump instruction in the EEPROM 11, store programs having different versions in the flash memory A 12 and the flash memory B 13, check the programs for their operations to judge whether or not the programs operate abnormally before executing the program in a flash memory selected in accordance with the jump instruction, and select the other flash memory when the program in the selected flash memory operates abnormally to execute the program stored in the other flash memory.

When the reset process is released by turning on the power source (step S310), the MPU 10 starts up the automatic operation check program of the EEPROM 11 and checks contents of flash memory designated by the jump instruction stored in the EEPROM 11 (step S311) as shown in FIG. 3. Assuming that the flash memory A 12 is selected, the MPU 10 checks contents of program stored in the flash memory A 12 with the automatic operation check program. When the MPU 10 confirms that the program operates normally with the automatic operation check program, the MPU 10 operates the system in accordance with the contents of the program stored in the flash memory A 12 (step S313) and terminates the processing (step S316).

When the MPU 10 confirms that the selected program does not operate normally with the automatic operation check program, the MPU 10 checks contents of the flash memory B 13 with the automatic operation check program (step S312) and, when it confirms that the program does not operate normally, it terminates the processing (step S316).

After confirming that the program stored in the flash memory B 13 operates normally, the MPU 10 rewrites contents of the EEPROM 11 so that the flash memory B 13 is selected when the power source is turned on the next time (step S314), operates the system in accordance with the contents of the program stored in the flash memory B 13 (step S315) and terminates the processing (step S316).

Third Embodiment

Now, the third embodiment of the present invention will be described with reference to FIGS. 4 and 5.

Figure 4:
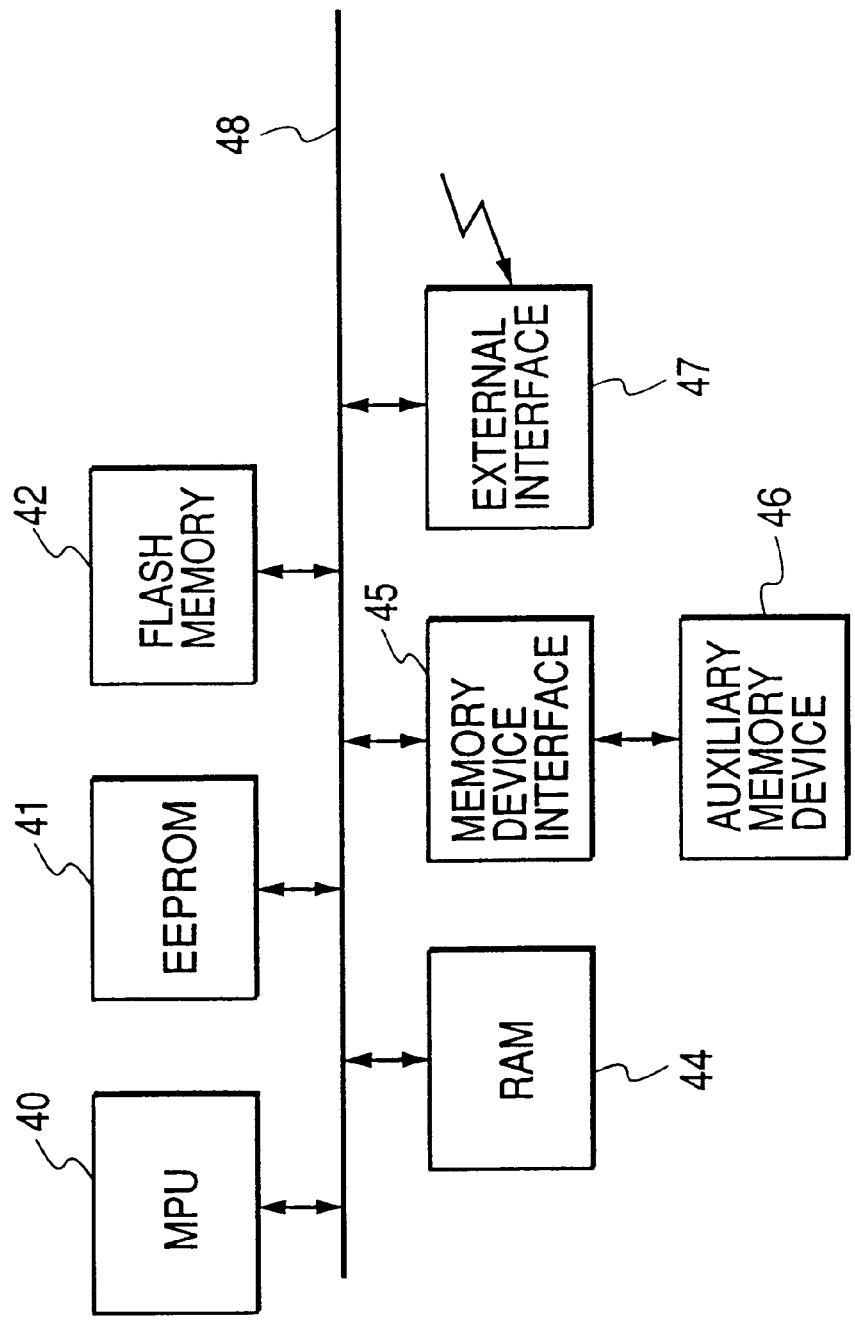
FIG. 4 is a block diagram showing a configuration of a third embodiment of the data processor according to the present invention.
Figure 5:
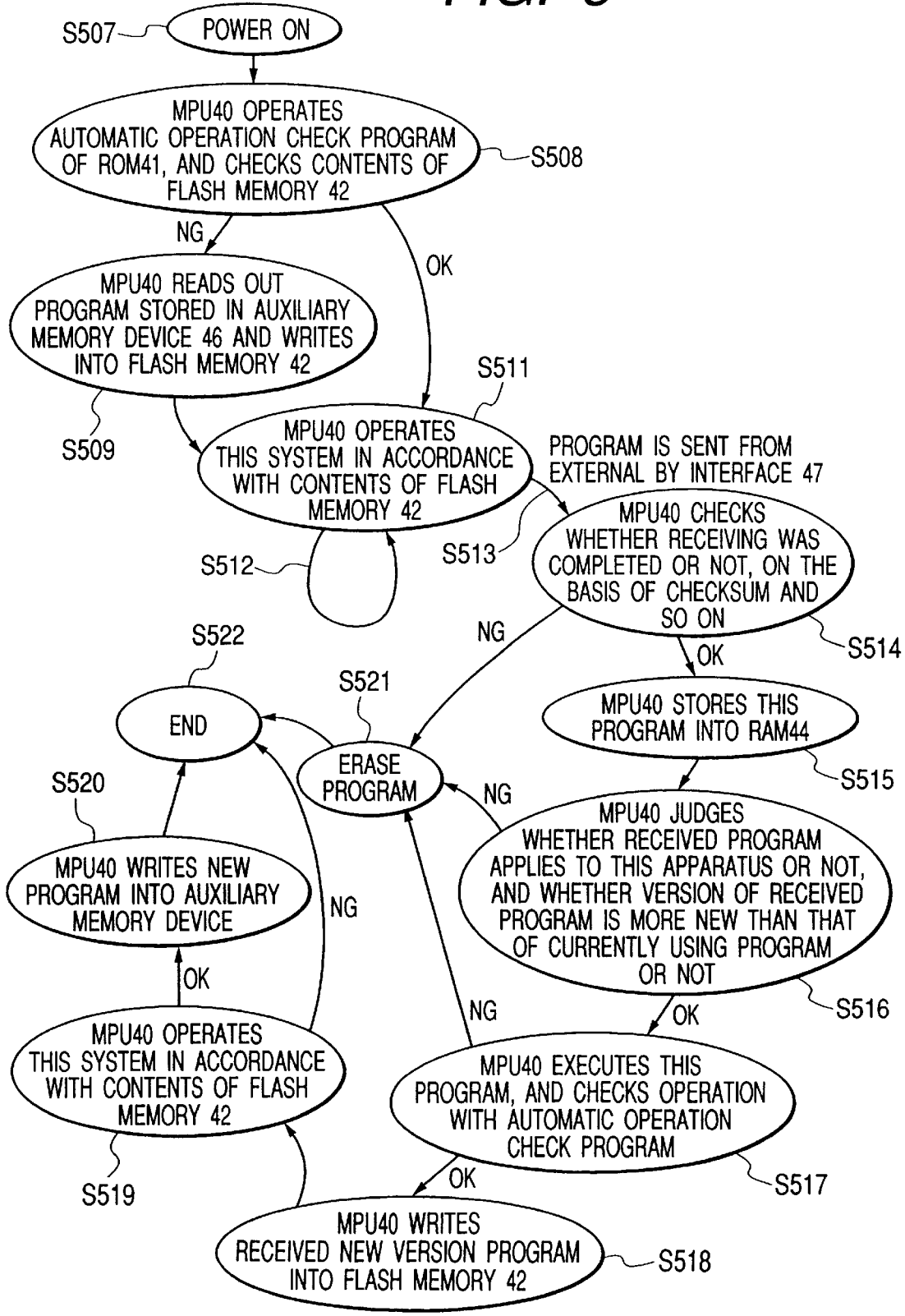
FIG. 5 is a diagram illustrating status transition of processes to update a program in the data processor shown in FIG. 4.

FIG. 4 is a block diagram showing a configuration of a data processor preferred as the third embodiment and FIG. 5 shows status transition of processes to update a program in the data processor shown in FIG. 4.

The data processor preferred as the third embodiment comprises, as shown in FIG. 4, an MPU 40 which executes process control including system control in accordance with a program stored in a ROM 41, a flash memory 42 which stores a version upgrading program for upgrading a version of the program stored in the ROM 41, a RAM 44 which provides a work area for the MPU 40, an auxiliary memory device 46, a memory interface 45 serving as an interface for the auxiliary memory device 46 and an external interface 47 serving as an interface for external devices (not shown): the MPU 40 being connected to each of the blocks by way of a common bus 48. Needless to say, other members are connected as occasion demands.

The program stored in the ROM 41 (system program) is a factory-shipped program. Together with the system program, an automatic operation check program is stored in the ROM 41.

Processing executed by the MPU 40 in the data processor will be described with reference to FIG. 5.

When a reset process is released by turning on a power supply with a power switch (not shown) (step S507), the MPU 40 reads out the automatic operation check program stored in the ROM 41 and starts up this program to check contents of the flash memory 42 with the automatic operation check program (step S508). Since the flash memory 42 does not store a version upgrading program until it is taken from outside, the MPU 40 starts up the system with the program stored in the ROM 41 (step S511).

When the system is started up and the MPU 40 receives a program transmitted by a communicating medium such as a broadcast wave or a telephone network from an external device by way of the external interface 47 during operation of the system (step S513), the MPU 40 checks whether or not the reception of the program is completed on the basis of a check sum (step S514) and when the reception of the program is not completed normally, it erases the received program (step S521) and terminates the processing (step S522).

When the reception of the program is completed normally, in contrast, the MPU 40 temporarily stores this program into the RAM 44 (step S515). Then, the MPU 40 judges whether or not the received program is applicable to the system of the data processor and has a version which is newer than that of a currently operating program on the basis of data such as ID contained in the received program (step S516).

When the received program is not applicable to the system of the data processor or when the version of the received program is not newer than the version of the currently operating program, the MPU 40 judges this received program as an unwanted program and erases it (step S521).

When the received program is applicable to the system of the data processor and has a version newer than that of the currently operating program, the MUP 40 judges that the received program is a version upgrading program and checks the program for its operation (step S517). For this operation check, the MPU 40 starts up the received program and checks its operation with the automatic operation check program. When the MPU 40 confirms that received program does not operate normally as a result of the operation check, it erases the received program (step S521).

When the MPU 40 confirms that the received program operates normally as a result of the operation check, the MPU 40 writes the received program as a version upgrading program into the flash memory 42 (step S518) and operates the system in accordance with the program stored in the flash memory 42 (step S519). When the system does not operate normally, the MPU 40 terminates the processing in a condition where the program is written in the flash memory 42 (step S522). When the system operates normally, the MPU 40 writes the received program into the auxiliary memory device 46 by way of the memory device interface 45 (step S520) and terminates the processing (step S522).

When the received program is a version upgrading program which operates normally, the received program is written into the flash memory 42 and the auxiliary memory device 46 respectively. Since the version upgrading program stored in the flash memory is selected when the power source is turned on the next time, the data processor starts up the new version program.

When the power source is turned on the next time (step S507), the MPU 40 reads out the automatic operation check program from the ROM 41, starts up this program and checks operation of the version upgrading program stored in the flash memory 42 with the automatic operation check program (step S508). When the MPU 40 confirms that the version upgrading program operates normally with the automatic operation check program, it operates the system program stored in the ROM 41, thereby starting up a system having an upgraded version (step S511).

When the MPU 40 confirms that the version upgrading program does not operate normally with the automatic operation check program, in contrast, the MPU 40 reads out the version upgrading program from the auxiliary memory device 46 by way of the memory device interface 45 and writes it into the flash memory 42 (step S509). The MPU 40 operates the system program stored in the ROM 41 and the version upgrading program stored in the flash memory 42, thereby starting up the system having the upgraded version (step S511). The MPU 40 subsequently repeatedly executes operations similar to those described above.

Since the version upgrading program is stored into both the flash memory 42 and the auxiliary memory device 46 as described above, the MPU 40 can read out the version upgrading program stored in the auxiliary memory device 46 and start up the system having the upgraded version even when the version upgrading program stored in the flash memory 42 is erased for some cause. Even when the version upgrading program is erased due to power failure occurring in the course of its writing, the program having an older version stored in the auxiliary memory device 46 and the factory-shipped system program stored in the ROM 41 prevent the system from misoperating or being incapable of starting up due to incomplete program updating into the flash memory 42.

Fourth Embodiment

Then, description will be made of the fourth embodiment with reference to FIGS. 6 through 9. The fourth embodiment is an example wherein an IRD (integrated receiver decoder) is used as a data processor.

Figure 6:
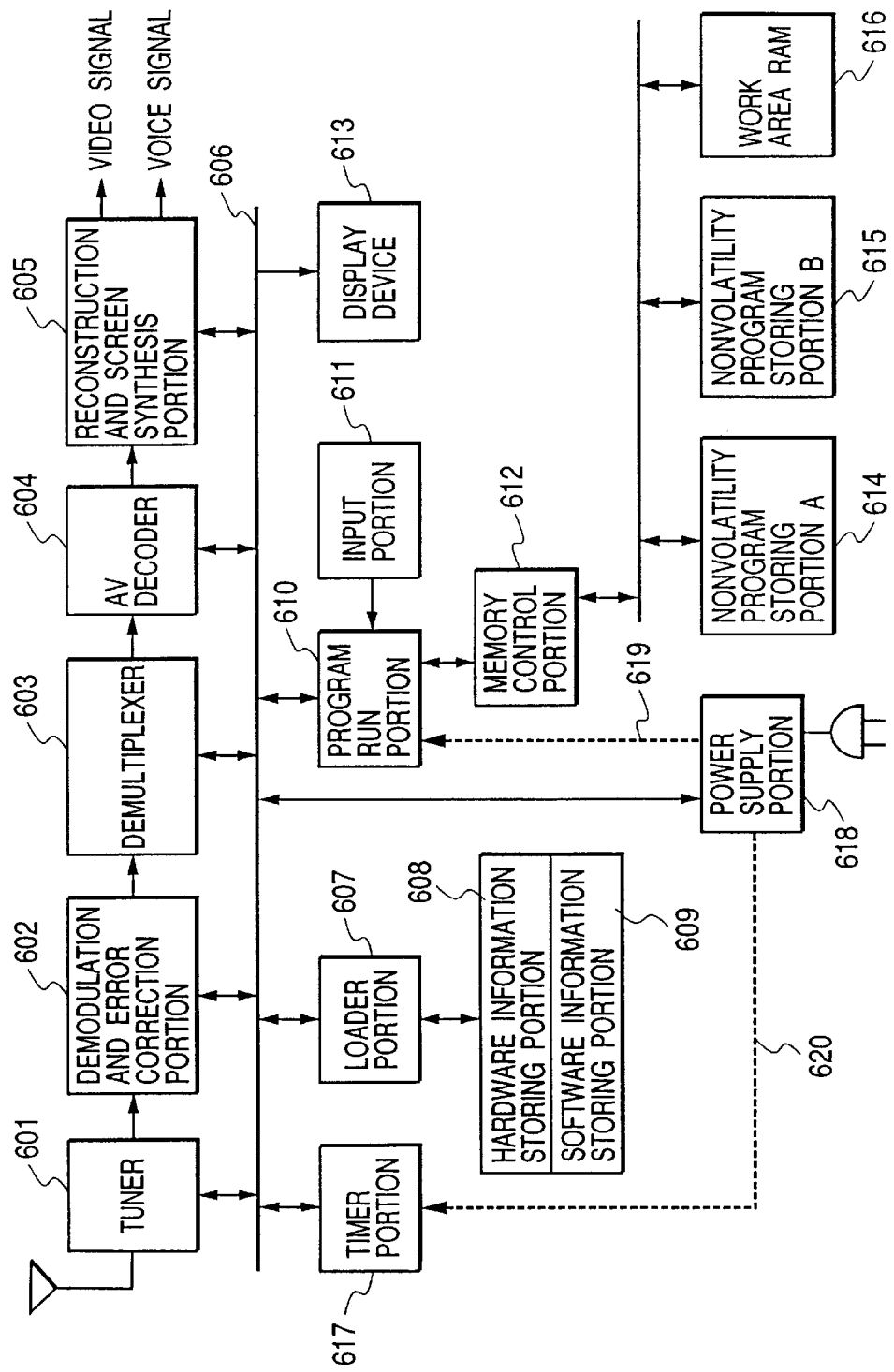
FIG. 6 is a block diagram showing a configuration of an IRD (integrated receiver decoder) for digital broadcasting preferred as a fourth embodiment of the present invention.

FIG. 6 is a block diagram illustrating a configuration of an IRD (integrated receiver decoder) for digital broadcasting preferred as a fourth embodiment. A broadcast wave is transmitted through a DVB (digital video broadcasting system), whereas images and voice are transmitted in accordance with MPEG2 of ISO/IEC 61818-2 and MPEG2 of ISO/IEC 61818-3 respectively.

A reference numeral 610 represents a program run portion which controls the IRD as a whole in accordance with a program and a reference numeral 606 designates a common bus which connects the program run portion 610 to each member.

A tuner 601 which receives a digital broadcast wave and selects a desired frequency as designated by the program run portion 610 provides a signal, which is subjected to demodulation, check for an error caused in a communication path and error correction in a demodulation and error correction portion 602. Then, the signal is sent to a demultiplexer 603 which selects a stream having a desired program identifier (PID) out of multiplexed streams, and outputs the stream in a condition where it is divided into an image-voice stream and a data stream which contains program information, program notification information and program data.

The data stream is sent to a loader portion 607 and the program run portion 610. An image-voice stream signal selected by the demultiplexer 603 is decoded by an AV decoder 604 into MPEG2 image data and voice data, which are reproduced into analog video signals and analog voice signals respectively by a reconstruction and screen synthesis portion 605 and output. Furthermore, the reconstruction and screen synthesis portion 605 is cable of synthesizing an EPG screen, an operation screen or the like as designated by the program run portion 610 and providing them as video signals.

A reference numeral 611 represents an input portion which transmits user's operations to the program run portion 610 as input data from keys and a remote controller. A power switch and an OK key are included in this input portion 611.

A reference numeral 607 designates a loader portion which selects predetermined data from the data stream, thereby performing hardware storing control, software information storing control and program storing control. A reference numeral 608 denotes a hardware information storing portion for storing hardware information such as a manufacturing company and a model number which are not rewritten. A reference numeral 609 represents a software information storing portion for storing a software version number from the loader portion 607 which is rewritten into a downloaded version by a program updating work.

A reference numeral 612 designates a memory control portion which controls a nonvolatility program storing portion A 614, a nonvolatility program storing portion B 615 and a work area RAM 616. The nonvolatility program storing portion A 614 and the nonvolatility program storing portion B 615 are composed of non-volatile memories which hold their contents even while they are not electrically energized and provided as areas to store programs having different versions, and the memory control portion 612 determines, at a power on time, either of the programs stored in the nonvolatility program storing portions which is to be executed. When a program to be updated from the loader portion 607 is downloaded and updated, the memory control portion 612 determines either of the nonvolatility program storing portions into which the program is to be written. The work area RAM 616 is used by the program run portion 610 as a work area RAM during execution of a program.

A reference numeral 613 is a display device which uses a liquid crystal panel, a plasma panel or the like, and displays messages and operating conditions such as "standby," "received program channel," "kind of network," "on program updating," "completion of program updating" and "failure of program updating" in pictograms, icons and characters.

A reference numeral 617 represents a timer portion which can be set by transmitting a command from the program run portion 610 by way of the common bus 606 and is capable of notifying a predetermined time to the program run portion 610 when the predetermined time has elapsed.

A reference numeral 618 designates a power supply portion which can be set, even with a power switch turned off and a power supply cord is plugged in, in a standby condition where power is supplied only to the program run portion 610 and the timer portion 617, whereas other portions are deenergized by transmitting a command from the program run portion 610 by way of the common bus 606 since the power switch is contained in the input portion 611. The power supply portion 618 is not set in the standby condition upon turning off the power switch but can be set in this condition after the program run portion 610 executes some processing. When the power switch is turned on in the standby condition, the IRD is electrically energized as a whole and set in an operating condition. Reference numerals 619 and 620 represent lines to supply power from the power supply portion 618 to the program run portion 610 and the timer portion 617 respectively.

A program herein means a program which comprises a driver software such as an OS kernel or an MPEG driver or the like and an application software, etc. for EPG display screen or an operating screen.

Operations of the fourth embodiment will be described with flowcharts shown in FIGS. 7 through 9. Let us assume that an effective program is stored in the nonvolatility program storing portion A 614 and contents of the nonvolatility program storing portion B 615 are ineffective in an initial condition.

When the power switch is turned on in the standby condition (step S701), the memory control portion 612 reads out contents of the nonvolatility program storing portion A 614 and the program run portion 610 starts executing the contents of the nonvolatility program storing portion A 614 (step S702). The program run portion 610 adequately controls the tuner 601, the demodulation and error correction portion 602, the demultiplexer 603 and the AV decoder 604 by way of the common bus 606, thereby setting each of the portions in a condition that it is capable of receiving a broadcast wave (step S703).

The IRD continuously receives a program designated by a user who manipulates a key or a remote controller on the input portion 611, and outputs a video signal and a voice signal from the reconstruction and screen synthesis portion 605 (step S704). When a PID which indicates notification information, for example PID=0040h, is received during reception of the broadcast wave (step S705), the data, i.e., notification data indicating "load data containing a manufacturing company, a model number, a program version and a program identifier (PID), as well as a transmitting network number, a transport number, a transmission start time and a transmission end time" is transmitted by way of the demultiplexer 603 to the program run portion 610 and the loader portion 607 which writes "download data containing the program identifier (PID), the transmitting network number, the transport number and the end time" of the notification information into an empty area of the nonvolatility program storing portion A 614 by way of the memory control portion 612 (step S706).

The program run portion 610 compares the manufacturing company and the model number stored in the hardware information storing portion 608 with the manufacturing company and the model number contained in the sent notification information, and judges that a program is to be updated in its IRD (step S707) and proceeds to the next step when the manufacturing company and the model number are coincident or intercepts the program updating when manufacturing company and the model number are not coincident (step S711).

Furthermore, the program run portion 610 compares the software version number stored in the software information storing portion 609 with the software version data contained in the sent notification information, and judges that an updated program is to be sent (step S708) and proceeds to the next step when the version in the sent information is in advance or intercepts the program updating otherwise (step S711).

By using transmission start time data, the program run portion 610 reserves reception of an updated program by setting the timer portion 617 so that it informs a predetermined time a little earlier than the transmission start time (step S709) to the timer portion 617.

Let us assume that the timer portion 617 informs the predetermined time a little earlier, for example 1 minutes, than the transmission start time (step S710). In the standby condition where electric power is not supplied to portions other than the program run portion 610 and the timer portion 617, the IRD is judged as inoperative (step S801), and power supply portion 618 turns on the power switch to supply electric power to each portion of the IRD (step S802). If the IRD is operating, the program updating is intercepted (step S711).

The program run portion 610 calls out the notification information from the nonvolatility program storing portion A 614, sets the tuner 601 and the demodulation and error correction portion 602 using data of the transmitting network number and the transport number in the notification information, and sets the demultiplexer 603 using downloaded data containing the program identifier (PID) (step S803). The program run portion 610 checks the tuner 601 for its receiving level and proceeds to the next step when the receiving level is larger than a predetermined value (step S804) or intercepts the program updating otherwise (step S711).

The program run portion 610 reads out the notification information containing the end time of program updating from the nonvolatility program storing portion A 614, checks whether or not another program booking coexists before the end time (step S805) and proceeds to step S806 when another program does not coexist or intercepts the program updating when another program coexists (step S711).

The program run portion 610 is set in a condition where it does not receive a remote control key operation from the input portion 611 to prevent the IRD from misoperating due to an accidental input operation during the program updating (step S806).

The display device 613 displays a pictograph "on program updating" which notifies the user that a program is going to be updated and a remote control key operation is not received until the program updating completes (step S807). The program run portion 610 starts receiving the program to be updated as reserved (step S808). The program run portion 610 checks received program data for transmogrification using the CRC check and check sum (step S901) and proceeds to step S902 when the program data is free from the transmogrification or displays a pictograph indicating failure of program updating on the display device 613 (step S907) and sets the IRD in the standby condition when the program data has transmogrification and the program updating is intercepted due to the occurrence of an errors during program updating (step S906).

When the program run portion 610 judges that transmogrification does not exist in the received program data in step S901, it writes the received program data into the nonvolatility program storing portion B 615 in which the ineffective data is currently stored (step S902). Even if power failure or another cause makes it impossible to complete the writing of the program data into the nonvolatility program storing portion B 615 at this step, the IRD can be started with the program stored in the nonvolatility program storing portion A 614 when the power switch is turned on once again since the nonvolatile program storing portion A 614 or the contents of the memory control portion 612 are not changed at all.

After completing the writing of the program data, the program run portion 610 changes the memory control portion 612 so as to make access to the contents of the nonvolatility program storing portion B 615 (step S903) and modifies the contents of the software information storing portion 609 into contents of the updated program version (step S904).

Upon completing the program updating as described above, the display device 613 displays a pictograph indicating the completion of the program updating (step S905) and the IRD is set in the standby condition (step S906). When the power switch is turned on the next time, the program which is written and updated in the nonvolatility program storing portion B 615 is loaded and executed.

Programs are stored alternately into the two nonvolatility program storing portions dependently on operating conditions of the IRD each time a program is updated.

Fifth Embodiment

The fifth embodiment will be described with reference to the accompanying drawings.

Figure 7:
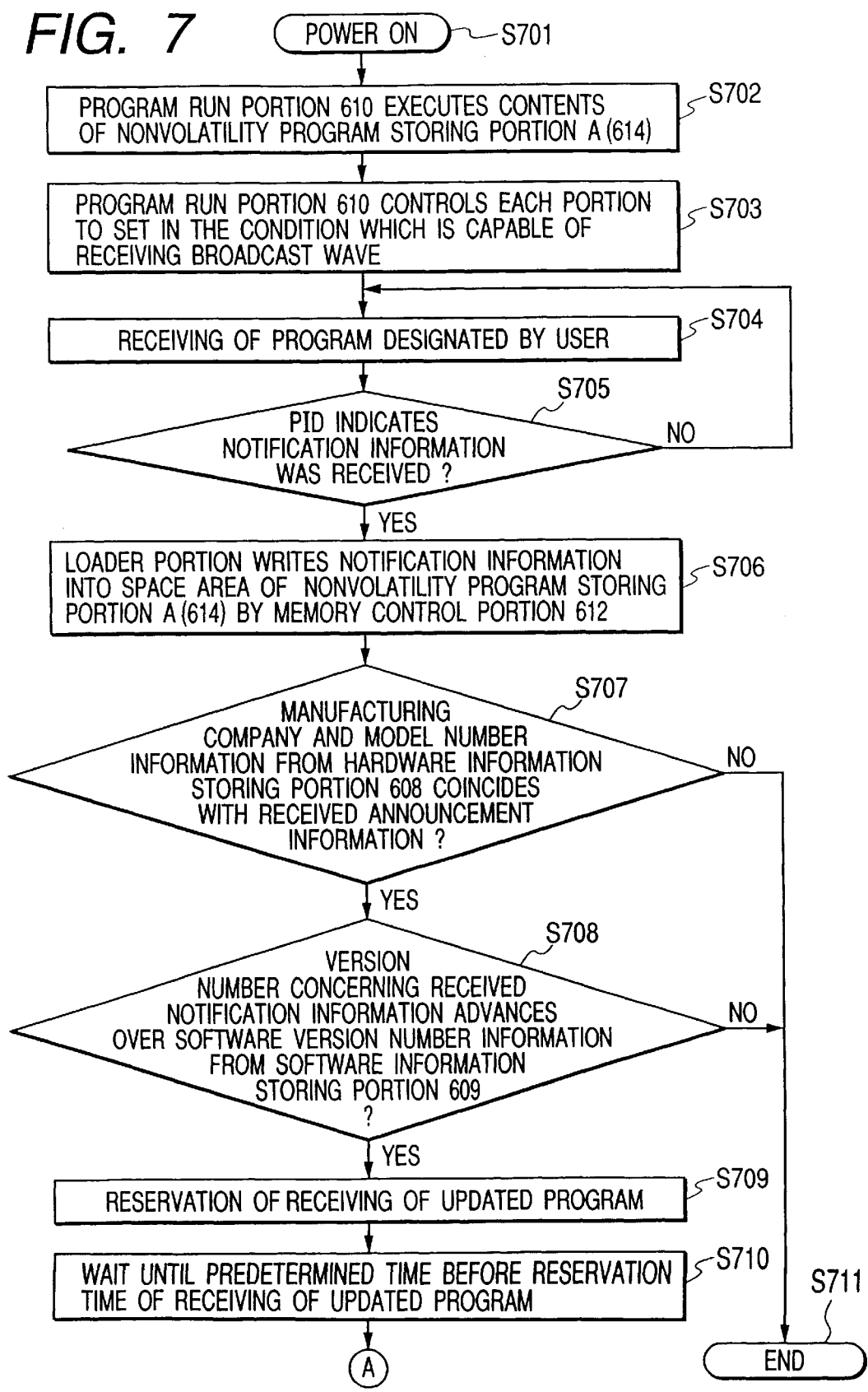
FIG. 7 is a flowchart illustrating data processings by the IRD preferred as the fourth embodiment.
Figure 10:
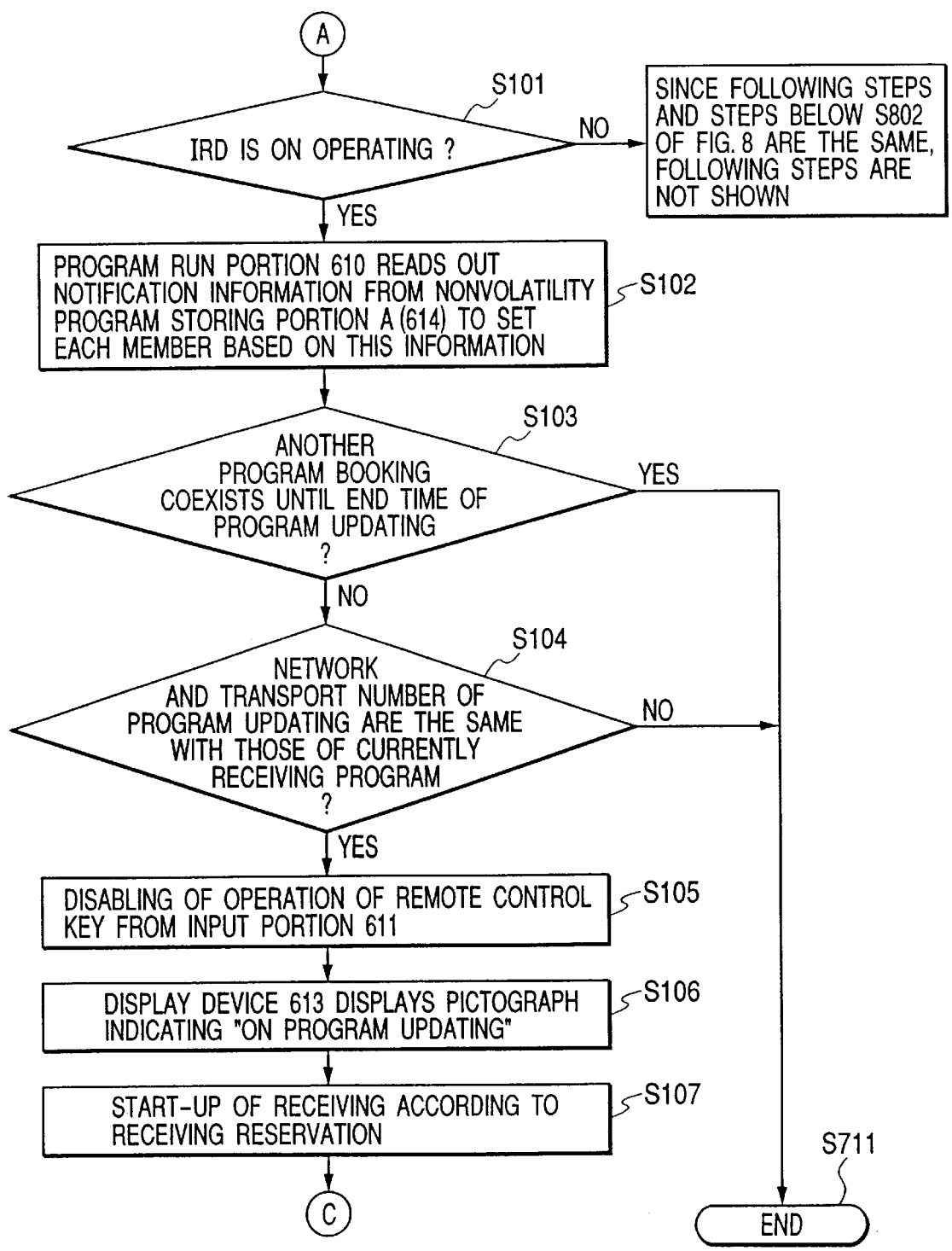
FIG. 10 is a flowchart illustrating data processings by an IRD preferred as a fifth embodiment of the present invention.
Figure 11:
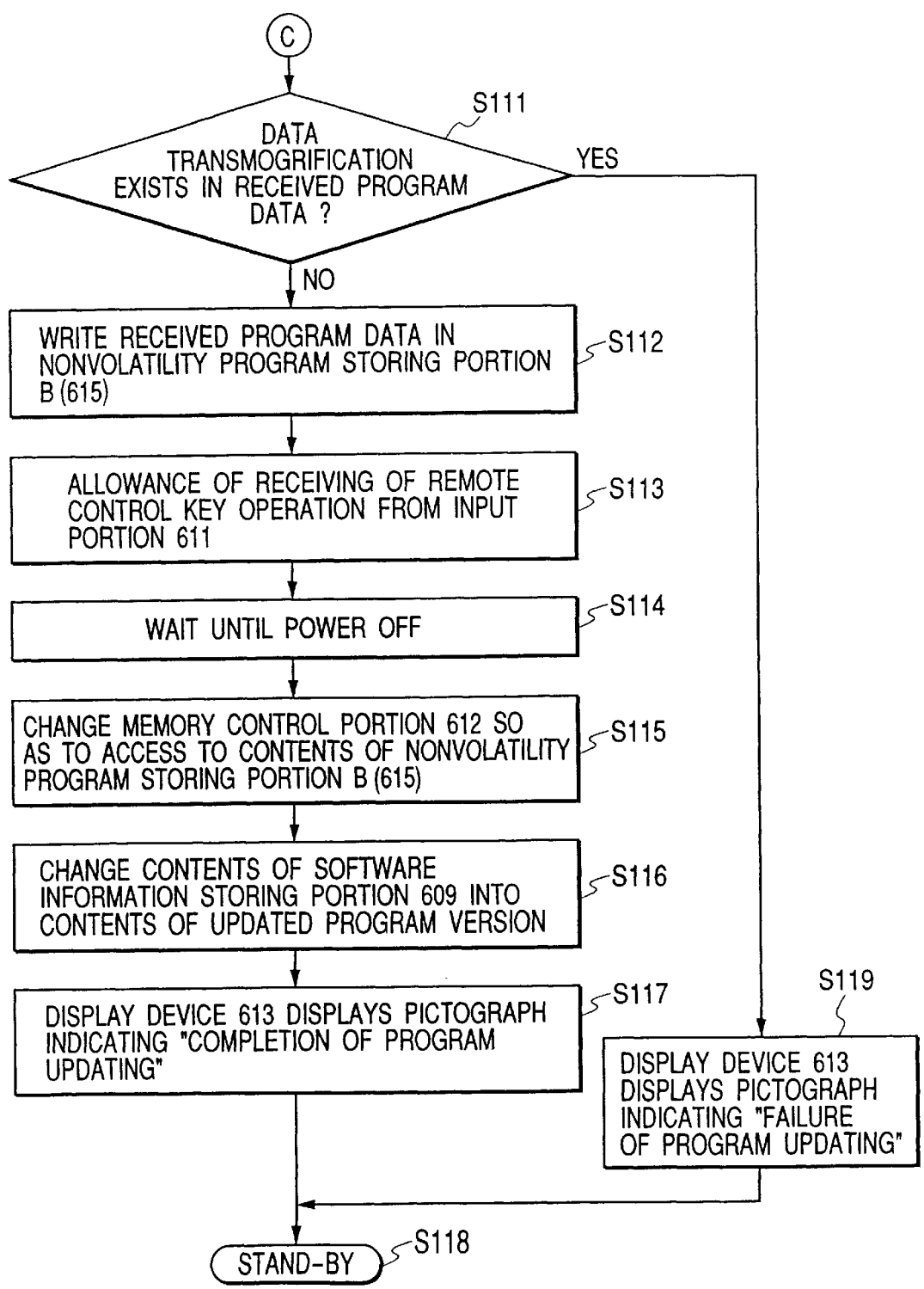
FIG. 11 is a flowchart illustrating data processings by the IRD preferred as the fifth embodiment of the present invention.

The fifth embodiment has a configuration which is the same as that shown in FIG. 6, and operates in a sequence illustrated in flowcharts presented as FIGS. 7, 10 and 11.

Operations shown in FIG. 7 will not be described in particular since they are the same as those of the fourth embodiment which have been described above.

Figure 8:
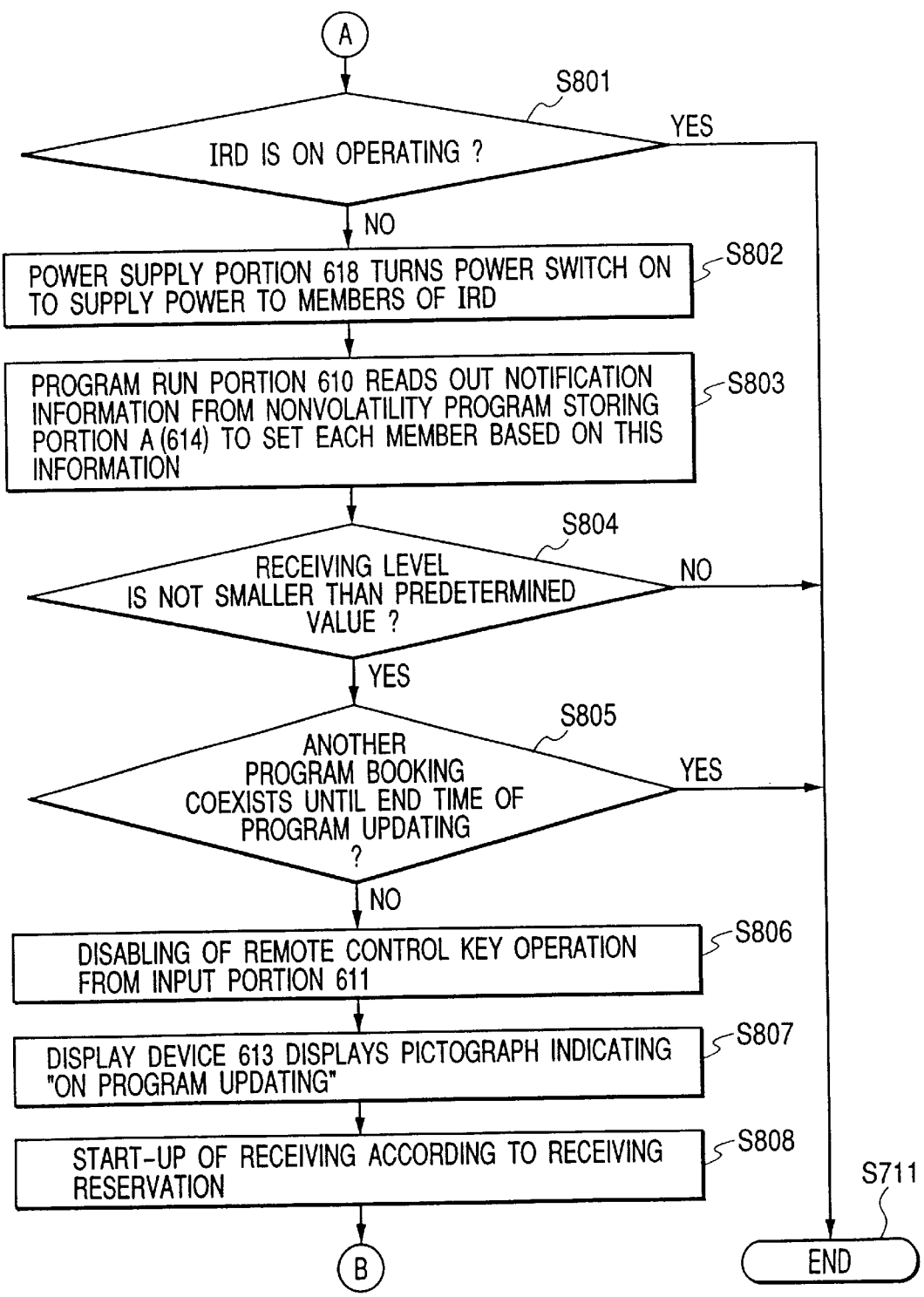
FIG. 8 is a flowchart illustrating data processings by the IRD preferred as the fourth embodiment.
Figure 9:
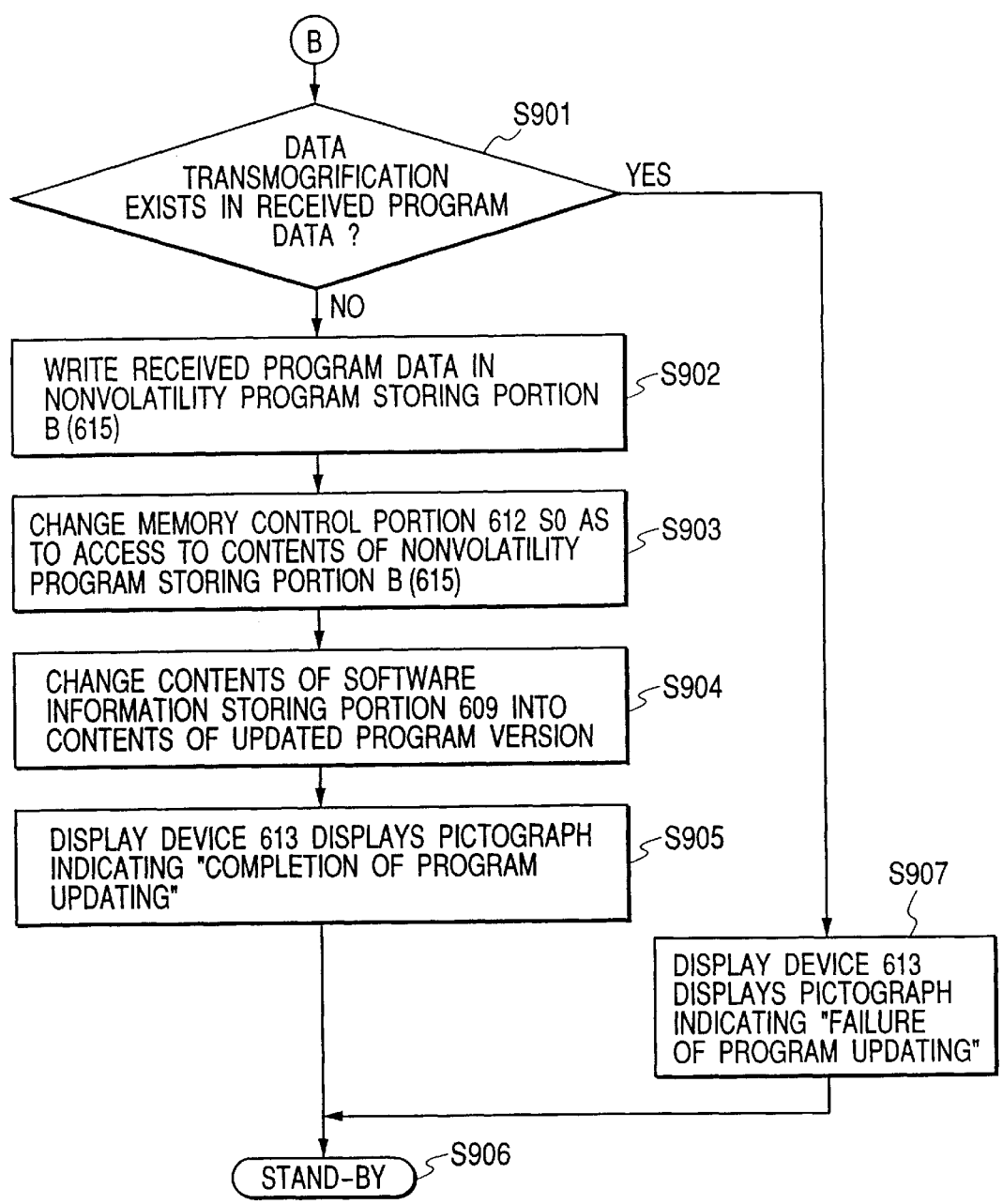
FIG. 9 is a flowchart illustrating data processings by the IRD preferred as the fourth embodiment.

When all the portions of the IRD are electrically energized at a step S101, the program run portion 610 judges that the IRD is operating and proceeds to a step S102 or when all the portions of the IRD are not energized, operations of the program run portion 610 are the same as those at the step S802 and subsequent steps in FIG. 8 which are not described once again.

At the step S102, the program run portion 610 makes access to the notification information stored in the nonvolatility program storing portion A 614, set the tuner 601 and the demodulation and error correction portion 602 using the transmitting network number and transport number contained in the notification information, and sets the demultiplexer 603 using the downloaded data containing the program identifier (PID).

The program run portion 610 makes access to the notification information the end time stored in the nonvolatility program storing portion A 614, checks whether or not another program booking coexists before the end time (step S103) and proceeds to a step S104 when another program booking does not coexist or intercepts the program updating when another program booking coexists (step S711). Since programs can be received at the same time when a network number and a transport number of program updating are the same as those of the program which is currently being received, the program run portion 610 checks whether nor not the numbers are the same (step S104) and does not update the program when the numbers are not the same (step S711). This is because a video signal and a voice signal may be recorded during reception of the programs and imprudent program updating during the operation of the IRD may make it unstable.

When the network numbers and the transport numbers are judged as the same by the step S104, the program run portion 610 is set in a condition where it does not receive remote control key operation signal from the input portion 611 (step S105). The display device 613 displays a pictograph "on program updating" which informs the user that a program is to be updated and the program run portion 610 does not receive a remote control key operation signal until the program updating completes (step S106).

The program run portion 610 starts receiving the program to be updated as reserved (step S107). The program run portion 610 checks whether or not transmogrification exists in received program data using the CRC check and the check sum (step S111) and proceeds to a step S112 when the transmogrification does not exists or intercepts the program updating when the transmogrification exists, whereby the display device 613 displays a pictograph indicating "failure of program updating" due to an error occurring during the program updating (step S119) and the IRD is set in the standby condition (step S118).

When the transmogrification does not exist, the program run portion writes received program data into the nonvolatility program storing portion B 615 in which ineffective data is currently written out of the two nonvolatility program storing portions (step S112). Upon completing the writing, the program run portion 610 is ready for receiving the remote control key operation signal from the input portion 611 (step S113) and the IRD is set in the usual operating condition.

When the user turns off the power switch on the input section 611 to terminate the operations of the IRD (step S114), the program run portion 610 changes the memory control portion 612 so as to make access to the contents of the nonvolatility program storing portion B 615 (step S115) and modifies the contents of the software information storing portion 609 into contents of the updated program version (step S116).

Upon completing the program updating, the display device 613 displays a pictograph indicating the completion of the program updating (step S117) and the IRD is returned to the standby condition (step S118). When the power switch is turned on the next time, the updated program which is written in the nonvolatility program storing portion B 615 is loaded and executed.

Sixth Embodiment

The sixth embodiment is configured to resume a preceding program version when the user feels that he cannot use an updated program as described in the fourth or fifth embodiment conveniently or make it familiar with himself.

Figure 12:
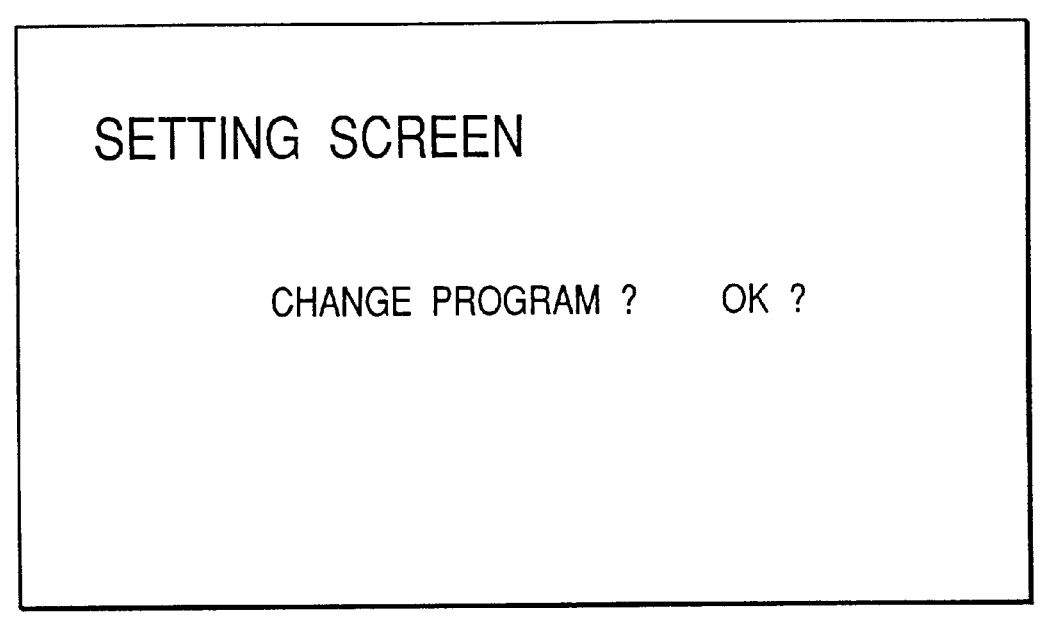

FIG. 12 shows a setting screen to modify a program to be started up. This screen is synthesized by the reconstruction and screen synthesis portion 605 under control by the program run portion 610 on the basis of an instruction made by the user on the input portion 611.

When the users issues an instruction OK by operating a remote controller or a key on the input section 611 in response to a question "Change program ?," the memory control portion 612 modifies settings so that a program is to be loaded, at a power on time, from the nonvolatile program storing portion different from the nonvolatile storing portion which stores a program currently being executed. Another program is loaded and started up when the power switch is turned on once again after it is turned off.

By repeating these operations on the setting screen, the user can select and execute two kinds of programs.

It is needless to say that a program is not updated when it is requested to update a program having a version which is newer than that of a program currently being updated but is the same as that of a program stored in the other nonvolatile program storing portion.

As understood from the foregoing description, the present invention makes it possible to prevent a system from misoperating due to incomplete program updating.

Furthermore, the present invention makes it possible to prevent a data processor from operating unnaturally due to program updating which is made while it is operating.

Moreover, the present invention makes it possible to selectively use a plurality of programs as designated by the user.

What is claimed is:

1. An information processing apparatus operating on the basis of a program stored in storage means, comprising:

receiving means for receiving an update program to be sent from outside and time information concerning a time at which said receiving means will receive the update program;

control means for setting, on the basis of the time information, said information processing apparatus to a condition possible to receive the update program;

updating means for updating the program stored in the storage means by the update program received by said receiving means, in the condition possible to receive the update program; and reservation means for reserving a time when said information processing apparatus is operated, wherein said updating means does not update the program when the reserved time and time indicated by the time information overlap.

2. An information processing apparatus according to claim 1, further comprising display control means for displaying information denoting "updating" on a display screen during updating by said updating means.

3. An information processing apparatus according to claim 1, further comprising:

instructing means for commanding performance of various operations; and command control means for invalidating a command made by said instructing means during updating by said updating means.

4. An information processing apparatus according to claim 1, wherein the update program received by said receiving means is stored in a storage area different from that in which is stored the program in the storage means.

5. An information processing apparatus according to claim 1, wherein said information processing apparatus is set to the standby condition early by a predetermined time before the update program is sent, on the basis of the time information.

6. A program updating method for an information processing apparatus operating on the basis of a program stored in storage means, comprising:

a reception step, of receiving an update program to be sent from outside and time information concerning a time at which said reception step will receive the update program;

a control step, of setting, on the basis of the time information, the information processing apparatus to a condition possible to receive the update program;

an update step, of updating the program stored in the storage means by the update program received in said reception step, in the condition possible to receive the update program; and a reservation step, of reserving a time when the information processing apparatus is operated, wherein said update step is not performed to update the program when the reserved time and a time indicated by the time information overlap.

7. A program updating method for an information processing apparatus according to claim 6, further comprising a display control step, of displaying information denoting "updating" on a display screen during the updating in said updating step.

8. A program updating method for an information processing apparatus according to claim 6, further comprising:

an instruction step, of commanding performance of various operations by the information processing apparatus; and a command control step, of invalidating a command made in said instruction step during updating in said update step.

9. A program updating method for an information processing apparatus according to claim 6, wherein the update program received in said reception step is stored in a storage area different from that in which is stored the program in the storage means.

10. A program updating method for an information processing apparatus according to claim 6, wherein the information processing apparatus is set to the standby condition early by a predetermined time before the update program is sent, on the basis of the time information.

11. A computer-readable storage medium storing a program for implementing a program updating method for an information processing apparatus operating on the basis of a program stored in storage means, the program comprising:

code for a reception step, of receiving an update program to be sent from outside and a time information concerning a time at which said reception step will receive the update program;

code for a control step, of setting, on the basis of the time information, the information processing apparatus to a condition possible to receive the update program;

code for an update step, of updating the program stored in the storage means by the update program received in said reception step, in the condition possible to receive the update program; and code for a reservation step, of reserving a time when the information processing apparatus is operated, wherein said update step is not performed to update the program when the reserved time and a time indicated by the time information overlap.

12. A computer-readable storage medium according to claim 11, further comprising code for a display control step, of displaying information denoting "updating" on a display screen during the updating in said update step.

13. A computer-readable storage medium according to claim 11, further comprising:

code for an instruction step, of commanding performance of various operations by the information processing apparatus; and code for a command control step, of invalidating a command made in said instruction step during updating in said update step.

14. A computer-readable storage medium according to claim 11, wherein the update program received in said reception step is stored in a storage area different from that in which is stored the program in the storage means.

15. A computer-readable storage medium according to claim 11, wherein the information processing apparatus is set to the standby condition early by a predetermined time before the update program is sent, on the basis of the time information.

* * * * *

UNITED STATES PATENT AND TRADEMARK OFFICE
CERTIFICATE OF CORRECTION

PATENT NO. : 6,728,956 B2  Page 1 of 1
DATED : April 27, 2004
INVENTOR(S) : Kenichiro Ono It is certified that error appears in the above-identified patent and that said Letters Patent is hereby corrected as shown below:

Column 13,
Line 1, "(step Sill)" should read -- (step S111) --.

Signed and Sealed this

Twenty-eighth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,728,956 B2  Page 1 of 1
APPLICATION NO. : 09/379731
DATED : April 27, 2004
INVENTOR(S) : Kenichiro Ono It is certified that error appears in the above-identified patent and that said Letters Patent is hereby corrected as shown below:

COVER PAGE (56) References Cited : U.S. PATENT DOCUMENTS

--6,611,902    08/2003    Kuroda et al.    711/162
      6,047,129    04/2000    Frye    717/172
      6,578,198    06/2003    Freeman et al.    717/168
      5,974,454    10/1999    Apfel et al.    709/221--

Signed and Sealed this

Twenty-second Day of August, 2006

JON W. DUDAS
*Director of the United States Patent and Trademark Office*